June 22, 1971 — E. J. CRANE — 3,585,675

POULTRY PICKER

Filed Aug. 16, 1968 — 4 Sheets-Sheet 1

INVENTOR.
EDWARD J. CRANE
BY
ATTORNEYS

INVENTOR.
EDWARD J. CRANE

ATTORNEYS

June 22, 1971 E. J. CRANE 3,585,675
POULTRY PICKER

Filed Aug. 16, 1968 4 Sheets-Sheet 3

INVENTOR.
EDWARD J. CRANE
BY
ATTORNEYS

United States Patent Office 3,585,675
Patented June 22, 1971

3,585,675
POULTRY PICKER
Edward J. Crane, Ottumwa, Iowa, assignor to International Agri-Systems, Inc., Ottumwa, Iowa
Filed Aug. 16, 1968, Ser. No. 753,251
Int. Cl. A22c 21/02
U.S. Cl. 17—11.1
10 Claims

ABSTRACT OF THE DISCLOSURE

A poultry picker machine for picking feathers from poultry suspended from overhead and carried through the machine. Positioned on each side of the path of travel of the poultry through the apparatus are a plurality of finger supports supporting a plurality of flexible fingers extending in at least three directions, that is, extending in a direction substantially perpendicular to the axis of rotation, in a direction askew to said axis, and in a direction parallel to such axis. Each of the supports are rotatable about axes orientated generally toward the path of travel of the bird. The finger supports are arranged in three banks, the upper and lower bank having their axes of rotation inclined downwardly and upwardly, respectively. On one side of the travel path opposite an upper bank is a rotatable drum-type finger support having a plurality of fingers extending radially therefrom.

The banks of finger supports are arranged to be adjustable as one unit. The assembly forming the bank is a single gear box assembly so that all of the finger supports of each bank are driven by one motor which is mounted on the assembly so that when adjusted the motor moves with the assembly.

BACKGROUND OF THE INVENTION

This invention relates to poultry picking apparatus and more particularly to such apparatus wherein the poultry to be picked are continually drawn through the machine by means of an overhead conveyor. Thus, this machine relates to the type of poultry picking apparatus particularly adapted for assembly-line preparation techniques.

As stated in my co-pending application Ser. No. 631,989, filed Apr. 19, 1967, entitled "Poultry Picker," of which this application is continuation-in-part, mechanical poultry plucking or picking apparatuses may be divided roughly into two distinct classifications. In one classification the bird is carried through the machine by means of an overhead conveyor and in another the bird is completely free from external shackling or retention during its pasage through the machine. The non-retained systems wherein no overhead conveyor is utilized have the distinct advantage of permitting the birds to tumble freely about within the apparatus in response to the engagement of the wiping-like picking fingers thereagainst. This freedom to tumble and, thus, move out of engagement with the fingers on a particular support, prevents barking, tearing and like mutilation of the bird resulting from excessive pressure exerted thereon by the flexible fingers. This type of machine has the distinct disadvantage, however, of requiring that the birds be removed from the overhead conveyor system within the particular process plant for passage through the picking apparatus, an operational step which must be executed ordinarily by hand. Subsequent to passage of the birds through the machine, they must then be reaffixed to the shackles for further processing.

That class of machines wherein the birds are retained by a conveyor during passage therethrough obviates the necessity and expense of providing labor to individually remove the birds from the overhead conveyor, place them into the picking machine, remove them therefrom and thereafter rehang them from the shackles. With this type of machine, however, the birds have not been free, heretofore, to tumble or otherwise move about within the apparatus and, therefore, are often compressed between the picking supports and subjected to wiping forces from the flexible fingers of sufficient force to bark or otherwise mutilate the poultry, thus rendering them unfit for prime marketing.

In an attempt to avoid the labor problems noted previously, most processors have turned to the type of machine wherein the bird remains on the shackle during passage therethrough, despite the fact that the results are concededly not as good as those obtainable in the non-retained type of machine. The necessity for this choice is obvious when labor costs, procurement, and the highly competitive market are considered. It is these factors which have forced the processor to run the risk of multilating a certain percentage of the birds processed and, perhaps, packaging some birds which are definitely of substandard condition attributable directly to the impinging forces of the feather-wiping fingers.

The apparatus disclosed in my co-pending application Ser. No. 631,989 combines the advantages of the retained and non-retained types of picking assemblies without incorporating the individual disadvantages thereof as pointed out above. Further, such picking apparatus has proven very successful in rough picking the bird. However, it has a very slight disadvantage in not completely finishing the picking operation since it leaves a few feathers on certain parts of the bird such as the crotch, flank, and shoulders. Therefore, this invention is an improvement on the invention of the aforesaid co-pending application.

OBJECTS AND SPECIFICATION

It is an object of this invention, therefore, to provide a poultry picking apparatus which not only has the advantages as outlined in my co-pending application Ser. No. 631,989 but also does a much better job of finishing the bird and particularly picking the feathers from the crotch, flank and shoulders.

More particularly, the object of this invention is to provide a picking machine which has more versatility since adjustments can be made within the machine for picking different types of birds and for reaching those areas which are difficult to reach by conventional picking machines.

In addition, it is the object of this invention to provide a different arrangement of picking supports so that every portion of the bird can be picked and the picking operation can be finished completely rendering the bird ready for dressing and eventual marketing.

The present apparatus presently provides a novel type of finger assembly in which there is a single gear box for a plurality of finger supports which form a bank of finger supports.

This invention provides a novel combination wherein a finger drum support is utilized in conjunction with the novel finger supports of my co-pending application so as to hold the bird down into position for action thereon by the fingers of the other finger supports.

It is also an object of this invention to provide a means for adjusting the position of the finger supports not only in one direction but in a compound adjustment fashion so that the finger supports can be adjusted linearly and rotatably.

These, as well as other objects of this invention will be readily understood with refrence to the following specification written in conjunction with the accompanying drawings wherein.

Figure 1:
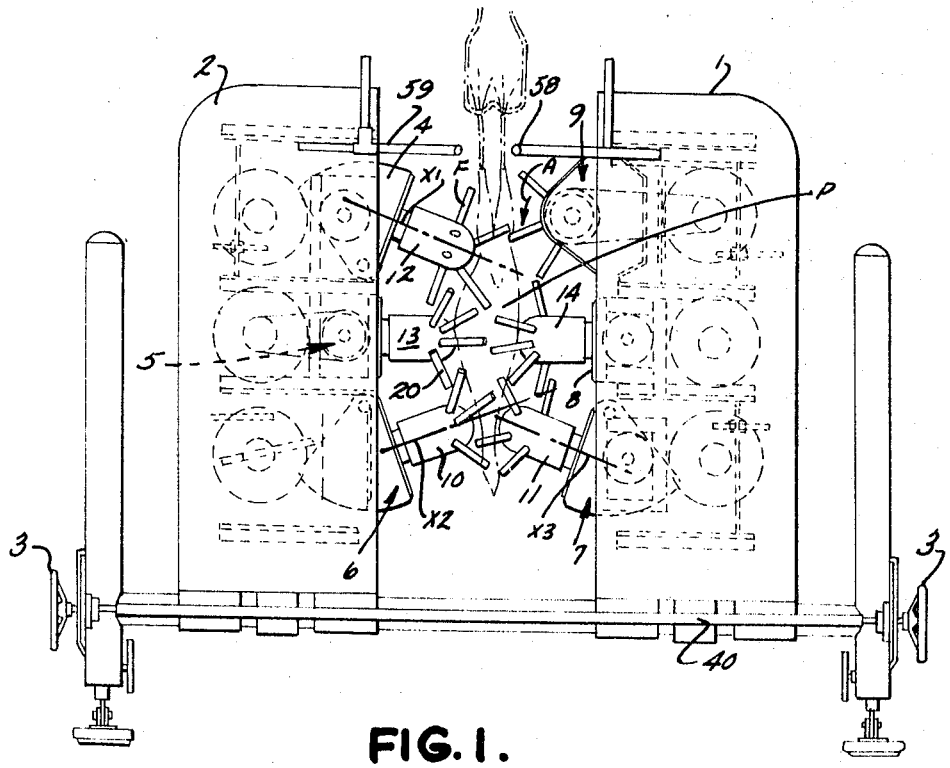
FIG. 1 is a side elevational view of the picking apparatus of this invention particularly illustrating the position of the finger supports.

Referring now to the drawings, a preferred embodiment of this invention will be described in detail. Referring initially to FIG. 1 it will be noted that the apparatus comprises two housings 1 and 2 spaced one from the other a distance determined by a well known adjustment means which is controlled by the adjustment wheel. 3. This adjustment wheel 3 is secured to a long screw element 40 so that when the adjustment wheels 3 are turned the two housings 1 and 2 are moved toward or away from each other. As previously stated, this adjustment mechanism is very conventional and in fact can be accomplished by well known motor operated means.

Located within the housing 2 are three banks of finger supports, such banks or finger support assemblies being designated by the reference numerals 4, 5, and 6. The housing 1 contains and supports the finger support assemblies 7 and 8, and the drum support assembly 9. It will be noted that the finger support assemblies 4, 6 and 7 are very much similar. These assemblies are inclined at an angle to the central finger support assemblies 5 and 8. These three assemblies 4, 6 and 7 are illustrated in more detail in FIG. 2 which will be described hereinafter. Each of these assemblies includes four finger supports of the type described in detail in my co-pending application Ser. No. 631,989. Briefly, these supports 10, 11 and 12 are somewhat bullet or dome-shaped and have a plurality of resilient fingers F secured thereto and extending in various directions both radially from the axis of rotation, askew to such axis, and substantially parallel thereto. Each support 10, 11 and 12 are removably secured to a drive shaft in a manner which is described in detail in my co-pending application Ser. No. 631,989. Reference is therefore made to such application for details thereof.

Finger supports 13 and 14 of the middle finger support assemblies or banks 5 and 8, respectively, are also of the type described in my co-pending application Ser. No. 631,989. It will be noted, however, that these finger supports extend in a substantially horizontal position toward the path of the bird.

It should be noted that from the side elevational view of FIG. 1 the combination of the five finger supports 20, 11, 12, 13 and 14 form a pocket P therebetween into which the fingers 20 of the supports extend. This pocket, in cross-section as viewed in FIG. 1, is substantially a shape which has two arcuate vertical sides approximating the shape of a bird. This is made possible by the way in which the upper and lower finger support assemblies can be tipped or inclined.

It should be obvious that when the bird is contained within this pocket defined by the finger supports the fingers extending into the pocket contact all portions of the bird and thus the complete cleaning of the bird is assured. At the same time the predetermined arrangement of the finger supports, in a fashion so that the supports are offset with respect to one another, permits the bird to move in and out of the spaces between the supports as is described more specifically in my co-pending application Ser. No. 631,989.

I have discovered that the inclusion of a drum-type finger support, which is designated by reference numeral 9, greatly enhances the cleaning ability of the apparatus, particularly as related to the finishing of the bird, that is, the complete picking of all the feathers off every part of the bird previous to eviscerating and packaging.

This particular finger drum assembly 9 is of the conventional type which includes a drum 15 to which is attached in any conventional way a plurality of rows of radially extending fingers 16. The drum extends the entire length of the housing 1 which corresponds to the length of the housing 2 and, although the drawings for sake of clarity show only a small portion of the finger, the fingers are located in rows along the entire length. The drum rotates in the direction indicated by the arrow A so that the fingers are wiping downwardly against the bird. This serves a dual purpose of forcing the bird downwardly into the pocket formed by the other finger supports and at the same time in so forcing the bird downwardly it cleans the place it strikes such as around the crotch and flank although fingers of the other finger supports also help to clean these particular places.

Figure 2:
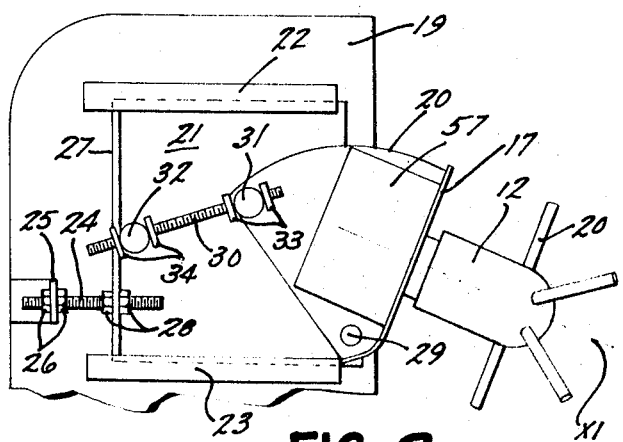
FIG. 2 is a fragmentary side elevational view of the adjustment mechanism for one of the finger supports, such adjustment being a compound adjustment.
Figure 6:
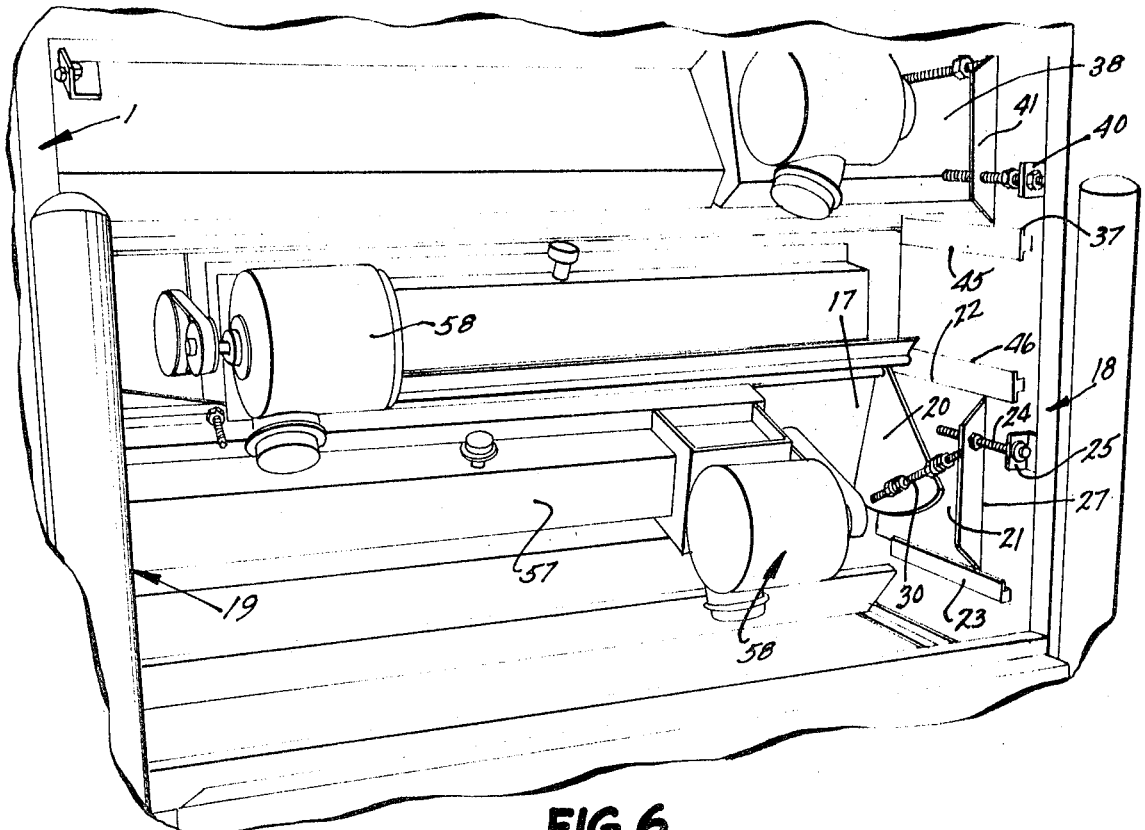
FIG. 6 is a perspective view of the inside of the machine looking at the backs of the gear box assemblies in which the finger supports are rotatably mounted and driven as will be described in more detail hereinafter.

Reference is now made to FIGS. 2 and 6 which more specifically disclose the construction and mounting of the finger support assemblies 4, 6 and 7. As previously stated, these are all very similar and therefore only one will be described in detail.

It will be noted that a support plate 17 extends between the two end walls 18 and 19 of the housing. This plate 17 has a triangular-shaped flange 20 which is pivotally mounted on a support plate 21 which in turn is slidably mounted between the tracks 22 and 23.

The position of the plate 21 within the track is determined by an adjustment bolt 24. This adjustment bolt is adjustably secured on a tab or flange 25 located on the end wall 19, the adjustment being accomplished by means of the nuts 26. The other end of the adjustment bolt 24 is adjustably secured on a flange 27 extending and forming a part of the plate 21. This adjustment is accomplished by the nuts 28. In other words, shortening the distance between the nuts 26 and 28 will slide the plate 21 to the left therefore retracting the assembly somewhat within the housing 2. This adjustment just described is the linear adjustment.

A rotatable adjustment is also provided by means of the structure which comprises the pivot member 29 on which the plate 17 is pivotably secured. The amount of the rotation or pivotal motion is controlled by the adjustment bolt 30 which extends through the two pivotal posts 31 and 32. Post 31 is pivotably secured to the plate flange 20 and post 32 is pivotably secured to the plate 21. Bolts 33 and 34 provide for the adjustment which in turn adjusts pivotal position of the plate 17 and thus the inclination of the axis $X_1$ about which the finger support 12 rotates. The finger support assemblies 6 and 7 are similarly adjustable for adjusting the inclination of the axis of rotation designated as $X_2$ and $X_3$ in FIG. 1.

It should be obvious from the above description that I have provided a compound adjustment, that is, an adjustment in a linear direction and also in a rotatable direction. This provides for a more versatile apparatus which can clean different types and sizes of birds more efficiently.

Figure 3:
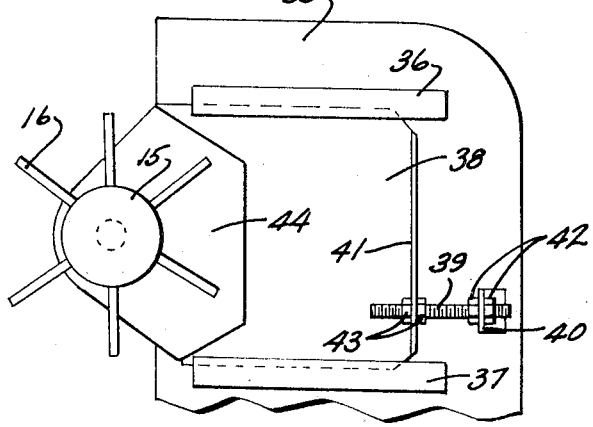
FIG. 3 is a side elevational, fragmentary view of the adjustment mechanism for the drum finger support.

Reference is now made to FIG. 3 wherein is shown the adjustment for the drum finger support assembly 9. As will be evident, the end wall 35 of housing 1 also has tracks 36 and 37 which support a plate 38 for sliding movement. The degree of this movement and the position of plate 38 is controlled by the adjustment bolt 39 which is secured at one end to a tab or flange 40 on the end wall 35 and at the other end to a flange 41 extending from and forming a part of the plate 38. The adjustment of the bolt is accomplished by the nuts 42 and 43 in such a fashion that the plate 8 can be adjusted within the tracks 36 and 37, thus providing an adjustment for the drum support assembly which includes an end support plate 44 secured to the plate 38 such as by welding or any suitable means. It will thus be seen that the drum support assembly 9 can be adjusted in and out of the housing 1 as desired for the particular bird being cleaned.

The finger support assemblies 5 and 8 which are the middle assemblies located between the upper and lower support assemblies are also linearly adjustable in and out of their respective housings 1 and 2. This is accomplished by a structure illustrated in FIGS. 6 and 8. Again, it should be understood that only one such assembly and its adjustment will be described since the other adjustment would be identical.

Figure 8:
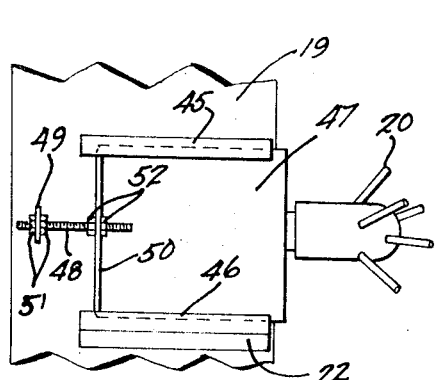
FIG. 8 is a side elevational, fragmentary view of the adjustment mechanism for the center finger support assemblies.

FIG. 8 discloses the tracks 45 and 46 secured to the end wall 19 and slidably supporting a plate 47. The position of the plate within the tracks 45 and 46 is determined by the adjustment bolt 48 secured to one end by a tab or flange 49 and at the other end to a flange 50 forming a part of the plate 47. The adjustment is accomplished by the nuts 51 and 52 in the manner described in relation to FIGS. 2 and 3. Thus, it will be noted that the middle bank of finger supports designated by the finger support assemblies 5 and 8 are also adjustable in and out of their respective housings 1 and 2.

Another feature of this invention is the unique construction of the finger supports 4, 5 and 6. These fingers are mounted in such a fashion that the drive transmission is located in one gear box. This gear box assembly is such that it supports the motor which drives the finger supports so that the entire assembly can be adjusted in and out and rotatably with very little difficulty.

Figure 9:
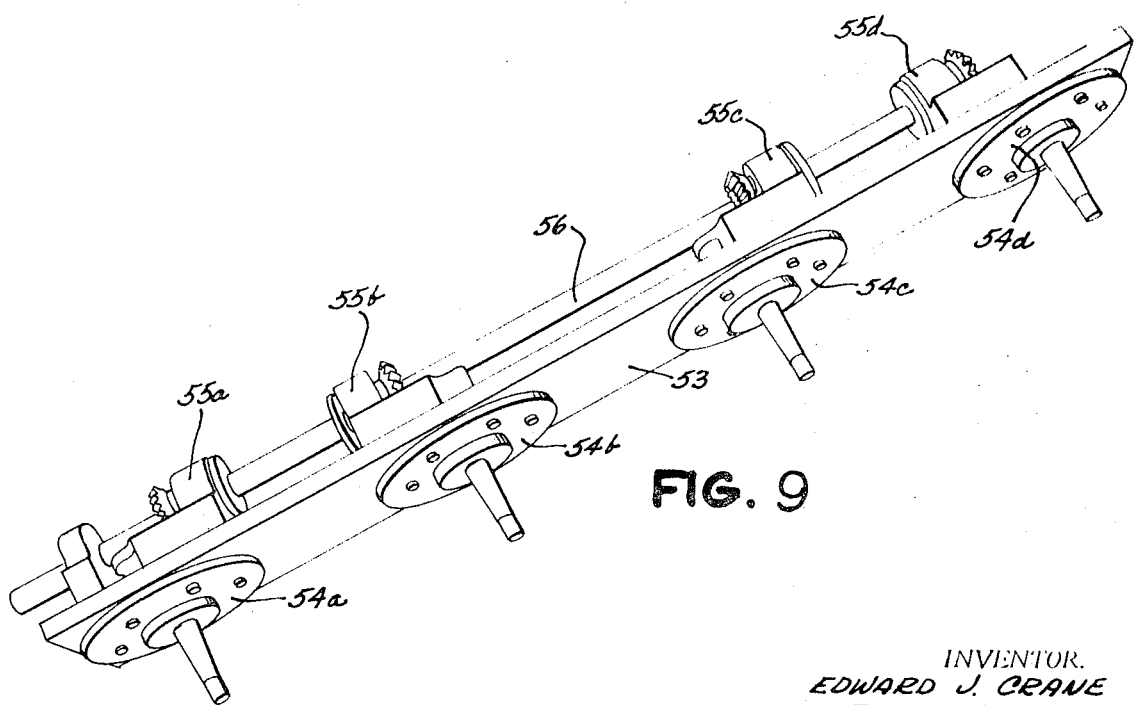
FIG. 9 is a perspective view of a part of the drive mechanism for a bank of finger supports.
Figure 7:
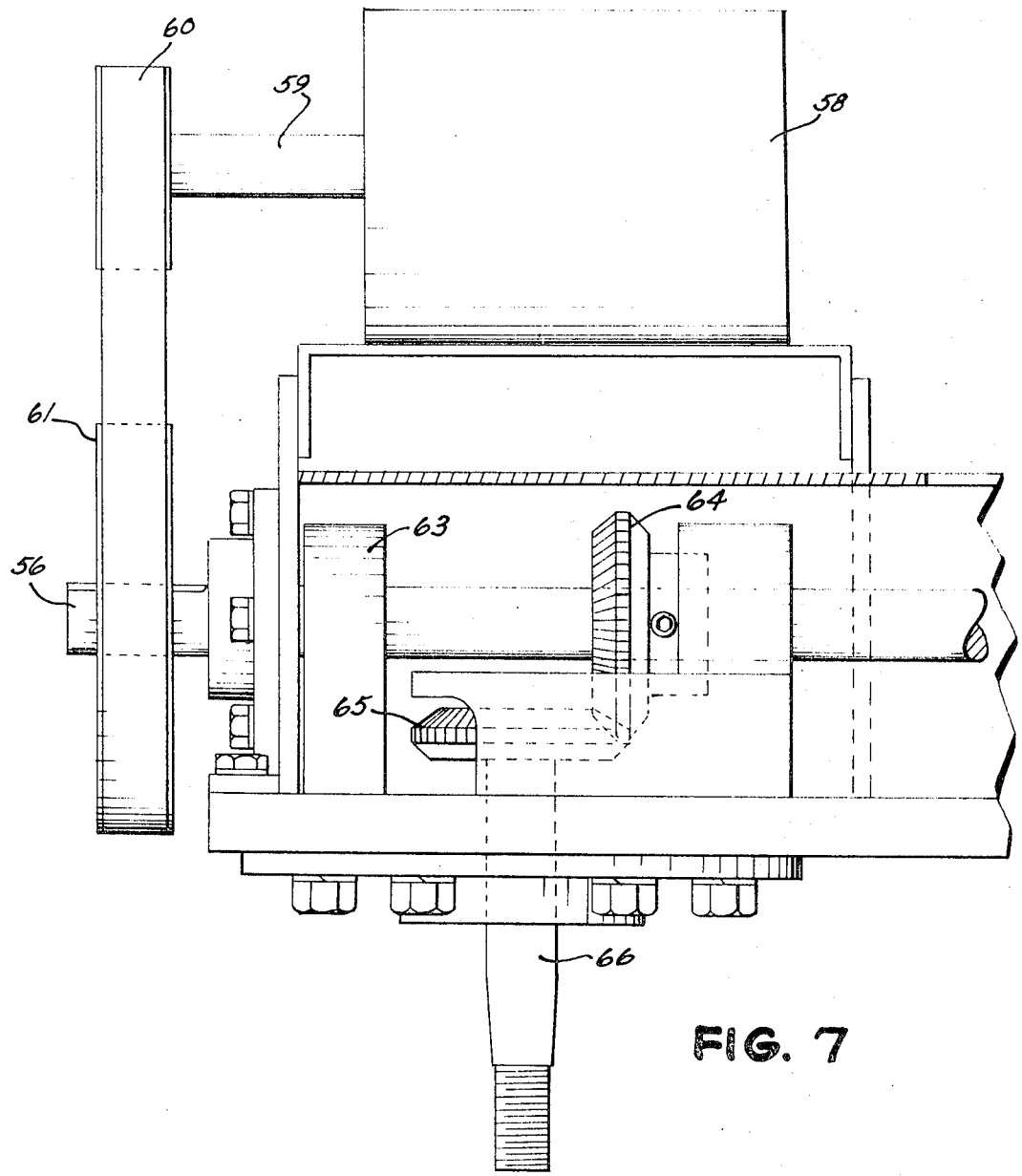
FIG. 7 is a cross-sectional view of the drive mechanism for one of the finger supports.

FIGS. 7 and 9 illustrate this construction most clearly. FIG. 9 discloses a bearing support plate 53 on one side of which are secured the bearing plates 54a, 54b, 54c and 54d. On the other side thereof are mounted the gear assemblies 55a, 55b, 55c and 55d. Coupled to these gear assemblies is the drive shaft 56. As is shown in FIG. 6 a cover or housing 57 is secured to the plate 53 over the gear assemblies. This cover or housing contains oil so that all of the gear assemblies are lubricated from a common housing which eliminates oil losses.

Figure 4:
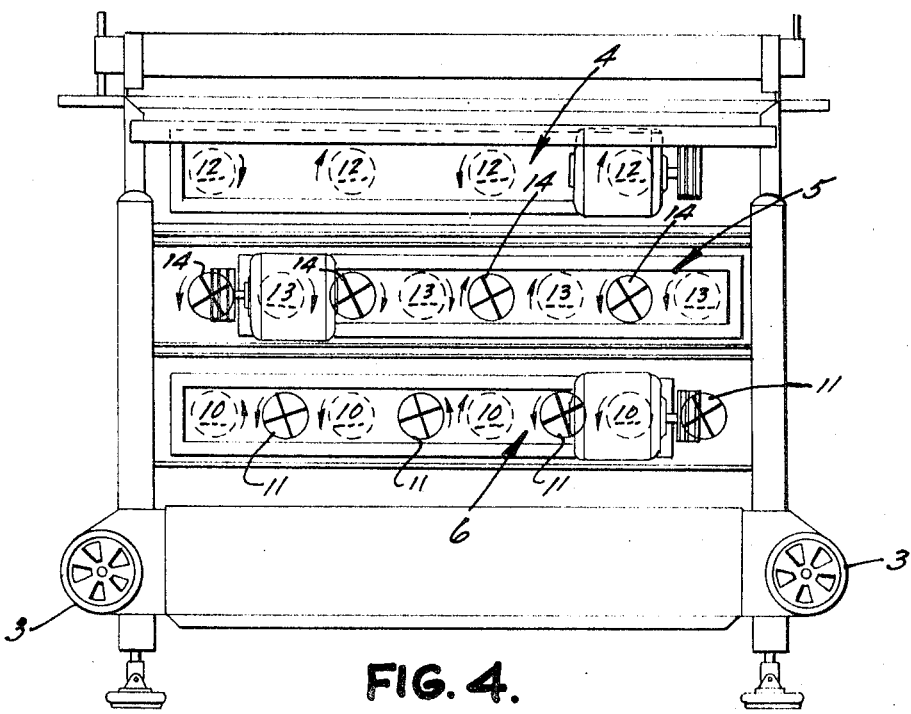
FIG. 4 is a schematic view of the side of the machine of the present invention illustrating the three banks of finger supports and also the arrangement of the finger supports one to each other.

FIG. 7 discloses in more detail one of gear assemblies and how the motor 58 is mounted with relation thereto. The motor 58 has a drive shaft 59 on the end of which is secured a pulley 60. A belt 62 connects the pulley 60 to the pulley 61 on the end of the drive shaft 56. As is shown, the drive shaft is rotatably mounted in a pillar or bearing 63. Keyed to the drive shaft is a beveled gear 64 which meshes with another beveled gear 65 secured on the end of the finger support drive shaft 66. It should be understood that the other gear assemblies 55b, 55c and 55d are all similar to that shown in FIG. 7, except for the arrangement of the bevel gears. Such gears are arranged so that adjacent finger supports rotate in opposite directions. The directions are as indicated in FIG. 4. It should be obvious from this discription that I have provided a single gear box assembly for driving a number of finger supports and that such assembly being easily secured to a support plate which is that illustrated in FIG. 2 at reference numeral 17 thus providing an assembly for a bank of finger supports all of which can be adjusted as previously described.

Figure 5:
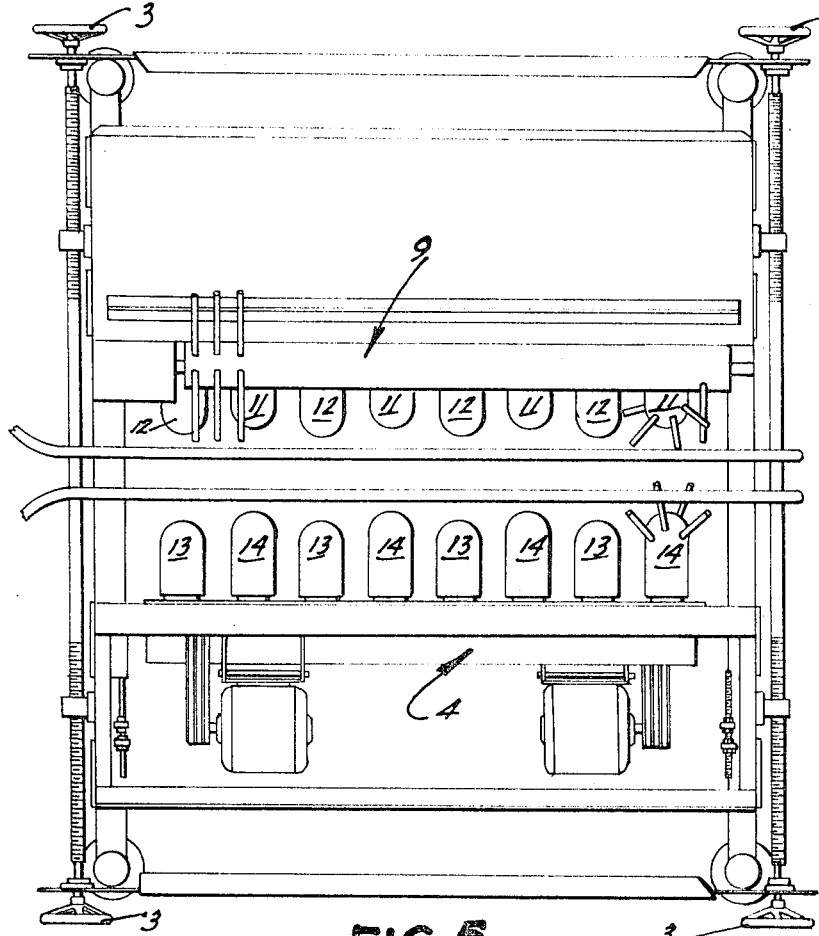
FIG. 5 is a top or plan view of the finger supports and again only illustrates the position of such supports, it being understood that the fingers are not shown in order to more clearly illustrate the position of the heads.

Having described the various constructions of my apparatus, it should be realized that the particular arrangement of the finger supports (along with the arrangement of the fingers as described in my co-pending application Ser. No. 631,989) is important to obtain the optimum result of my invention. FIGS. 4 and 5 schematically illustrate the position of the support heads with relation to each other and also the support drum. It will be noted that the axis of rotation of all the supports are offset with respect to one another. This is illustrated in FIG. 4 by showing in dotted lines the position of the bullet shaped finger supports on one side within the housing 2 and in solid circle with an "x" the position of the bullet shaped finger supports on the other side within the housing 1. FIG. 5 also illustrates that there is no stacking of the bullet shaped finger supports one above the other but they are all interspaced. As previously explained, this permits the bird or at least portions of the bird to work into those spaces when a force is exerted against them in that direction. Thus, the bird moves in the direction of said force without being bruised and by the same token in so moving in and out it is contacted by many different fingers from different directions so that the feathers are more completely removed from the bird.

OPERATION

Having described the structure of my invention and the arrangement of the support heads one with respect to the other, the operation should be quite evident. The bird is suspended overhead on a conveyor and conventionally is hung by its feet on a shackle which passes between the two shackle guide supports 58 and 59. The bird passes into the pocket P defined by the position of the finger supports. However, as it is passing along this path through the part P any force exerted on it which would bruise the bird will cause the bird to give and fall into the sub-pockets located between the supports. This occurs constantly as the bird passes through the machine so that as the bird passes through the machine it takes a very tortuous and serpentine route in and out and in so doing is subjected to the cleaning effect of many different fingers all from different directions thus effecting a more efficient cleaning operation.

Further, the fingers on the drum support are rotating downwardly and constantly therefore pushing the bird downwardly into the pocket and maintaining it in the pocket while at the same time contacting the bird at many different positions thus cleaning the feathers off at these positions.

It has been discovered that with this particular machine almost a perfect cleaning of the feathers from the bird is accomplished. In particular, the very difficult places to clean such as the crotch, flank, and shoulders are all very efficiently cleaned in a manner previously unknown to me by any other machine of this general nature.

The embodiments of the invention in which an exclusive property or privilege is claimed are defined as follows:

1. A poultry picking apparatus comprising:
   means for supporting and moving a bird in flexible fashion along a predetermined path;
   an overhead conveyor having a plurality of shackle members flexible suspended therefrom and adapted to retain poultry, the movement of said shackles defining a path along which said retained poultry move under the influence of said conveyor;
   a plurality of at least three banks of picking finger supports each support having flexible picking fingers affixed thereto, said supports adapted to rotate about axes oriented generally toward said path with the axes of an upper bank inclined downwardly and the axes of a lower bank inclined upwardly, the axes of rotation of all of said supports and the supports themselves being offset sufficiently with respect to one another along the path of movement of said poultry to prevent injurious compression of said poultry between said supports on opposite sides of the path by permitting at least portions of said bird to move between portions of said supports on the same side of said path; a drum shaped finger support mounted opposite the said upper bank of supports on the other side of said path, said drum-shaped support having a plurality of fingers extended radially from its axis of rotation which extends parallel to said path whereby said fingers move downwardly as said drum is rotated to aid in holding said bird downwardly between said other picking finger supports and means for rotating said supports.

2. The apparatus as set forth in claim 1 wherein at least some of said picking fingers affixed to each of said supports extend into and rotate in said path.

3. The apparatus as set forth in claim 2 wherein at least some of said picking fingers affixed to each of said supports are oriented generally radially to the axis of rotation of the associated support.

4. The apparatus as set forth in claim 3 wherein said supports are arcuately shaped.

5. The apparatus in claim 1 in which each support of each bank is adjustable for adjusting the inclination of its axis of rotation.

6. The apparatus of claim 5 in which the supports of each bank are mounted as a unit for simultaneous adjustment of all the supports of each bank.

7. The apparatus of claim 6 in which each support of each bank is adjustable toward and away from said path with respect to the other supports of its bank.

8. The apparatus as set forth in claim 1 wherein said rotating means rotates alternate of said supports in each upper, lower, and middle row in opposite directions.

9. The apparatus as set forth in claim 1 wherein the said finger supports, other than said drum-shaped support, are arcuately shaped having a forward rounded nose and a cylindrical body section, the rear of said body section lying adjacent the sidewalls of said apparatus, the rounded nose of supports lying adjacent said path, said nose having a plurality of first flexible fingers affixed thereto for rotation therewith, said first fingers intersecting said path and a plurality of second flexible fingers affixed to said body section and disposed generally radially to the axis of rotation thereof, said second fingers, when rotated, forming a picking boundary adjacent the interior sidewalls of said apparatus.

10. In a poultry plucking apparatus having means for supporting and moving a bird in flexible fashion along a predetermined path, the improvement comprising:

at least three banks of finger supports positioned to either side of said path, said supports being rotatable about axes oriented toward said path and having flexible picking fingers affixed thereto for rotation therewith, at least some of said fingers intersecting said path to contact poultry moving therealong, said supports being laterally offset from one another such that a substantially free space exists on the opposite side of said path from each of said supports whereby at least sections of said poultry are free to swing out of contact with said fingers after being wiped thereby; and a drum support provided opposite the said upper bank of supports on the other side of said path, and on said other side is provided a middle and lower bank of said supports, said drum support having a plurality of fingers extending radially from its axis of rotation which extends parallel to said path.

References Cited

UNITED STATES PATENTS

| | | | |
|---|---|---|---|
| 1,383,347 | 7/1921 | Stallman | 17—14 |
| 3,273,198 | 9/1966 | Tomlinson | 17—11.1 |
| 3,402,424 | 9/1968 | Brown et al. | 17—11.1 |
| 3,483,589 | 12/1969 | Smorenburg | 17—11.1 |

FOREIGN PATENTS

| | | | |
|---|---|---|---|
| 1,111,781 | 5/1968 | Great Britain | 17—11.1 |

LUCIE H. LAUDENSLAGER, Primary Examiner